No. 610,608. Patented Sept. 13, 1898.
J. G. LEYNER.
AIR INLET VALVE FOR AIR COMPRESSORS.
(Application filed Oct. 12, 1897.)
(No Model.)
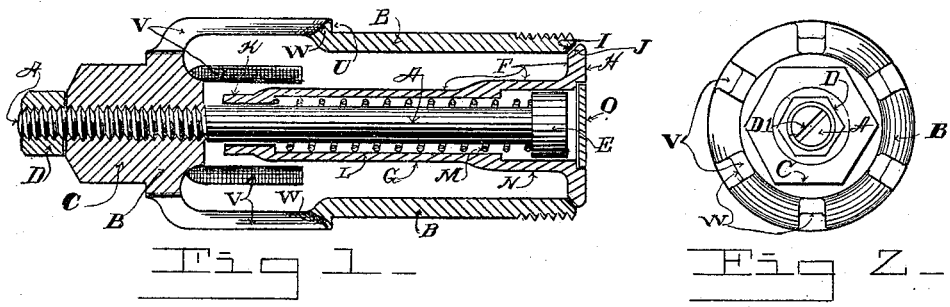
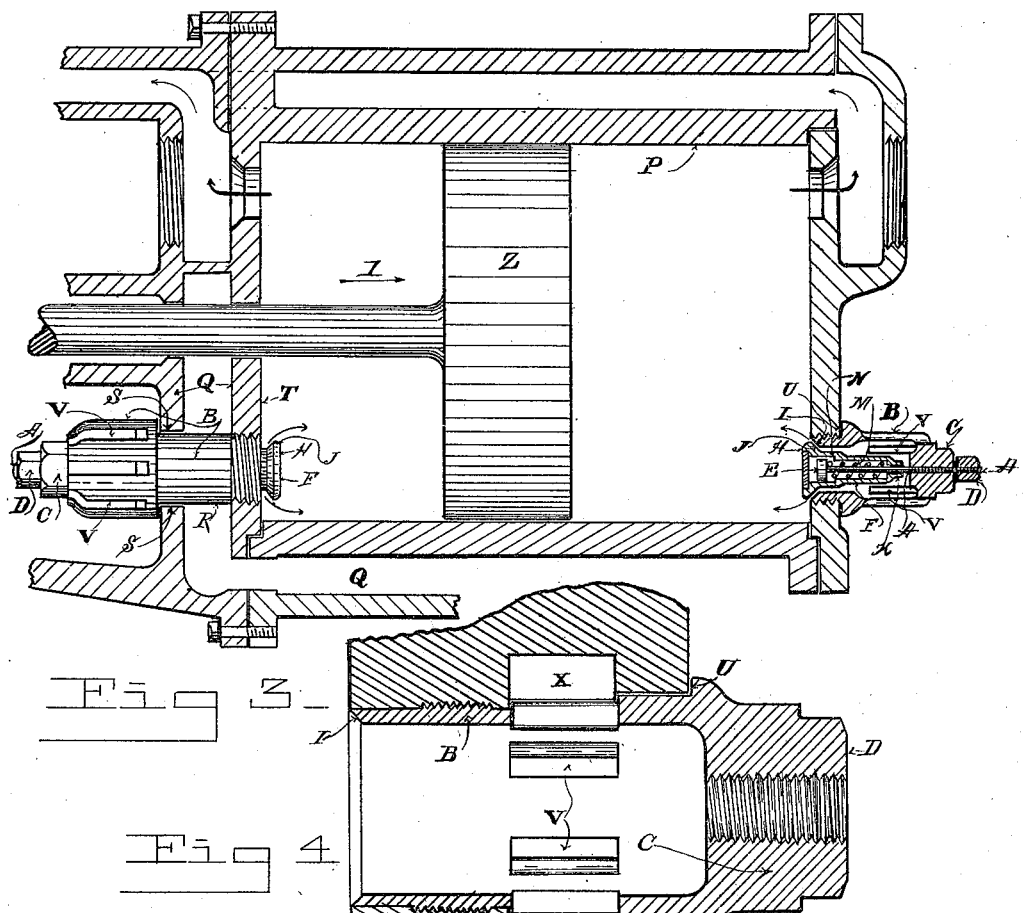

UNITED STATES PATENT OFFICE.

JOHN GEORGE LEYNER, OF DENVER, COLORADO.

AIR-INLET VALVE FOR AIR-COMPRESSORS.

SPECIFICATION forming part of Letters Patent No. 610,608, dated September 13, 1898.

Application filed October 12, 1897. Serial No. 654,951. (No model.)

*To all whom it may concern:*

Be it known that I, JOHN GEORGE LEYNER, a citizen of the United States of America, residing at Denver, in the county of Arapahoe and State of Colorado, have invented certain new and useful Improvements in Air-Inlet Valves for Air-Compressors; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to air-inlet valves for air-compressors; and the objects of my invention are, first, to provide a combined valve and seat which can be removably attached to any air-compressing cylinder; second, to provide a valve and an incasing hood in which the valve automatically seats itself; third, to provide a valve which is spring-controlled in one direction of its movement and which is mounted slidably on a stationary stem. I attain these objects by the mechanism illustrated in the accompanying drawings, in which—

Figure 1 is a longitudinal section through the center of my improved air-inlet valve. Fig. 2 is an end elevation of the same. Fig. 3 is a section of an air-compressor cylinder, showing the application of my valve to it; and Fig. 4 is a sectional view of a form of valve-hood used on a different construction of cylinder from that shown in Fig. 3, a fragment of which is shown attached to the hood.

Similar letters of reference refer to similar parts throughout the several views.

Referring to Fig. 1, A designates a stem. This stem is threaded at one end to a hood B, which consists of a round thimble-shaped casting which is provided centrally at its closed end with a reduced nut-shaped portion C. This stem is threaded to the center of this nut portion and extends beyond it far enough to receive a nut D, which bears against the nut portion of the hood and is used to lock the stem. The threaded end of the stem is provided with a screw-driver slot D', by which it is screwed tightly into the nut portion. Upon the opposite end of the stem I form a disk-shaped head E. The valve F consists of a tubular body portion G, with a disk-shaped seat portion H at its end. This seat portion fits against the open end of the hood, and in order to form a good bearing-surface between the valve and hood I bevel or chamfer the inner edge I of the hood and also the opposing edge J of the seat of the valve. The tubular portion G of the valve is mounted on the stem and its body portion is formed into three different-sized parts, the smallest K of which is at its free end and is slidably fitted to the stem. The second part L is larger in diameter than the end both inside and outside and forms a chamber around the stem in which is confined a coiled retractive spring M, that is mounted on the stem. A square shoulder is formed at the junction of this chamber with the bearing end of the valve, which forms an abutment for one end of the said spring. The part L extends throughout the tubular portion and blends into a larger portion N at and adjacent to its junction with its seat portion. This part is bored out to fit slidably on the head of the stem. I counterbore this end of the tube far enough to receive a washer O, which I place in the counterbore and secure it there by spinning the metal of the disk over the edge of the washer. The hood is preferably finished all over.

The hood shown in Fig. 1 is adapted for a cylinder similar to P in Fig. 3, which has a water-jacket Q formed at its ends as well as partially around it. The body R of the hood extends with a free but snug fit through a hole S, bored through the water-jacket, and its inner end is threaded and extends through the cylinder-head T of the cylinder. The outer end of the hood is larger in diameter than the body portion, and a square shoulder U is formed at its junction with the body portion. The hood is screwed into the cylinder-head until this shoulder bears against the water-jacket. Through the end of the hood around the nut portion and into the bore of the hood a number of slots V, forming air-passages, are milled, which extend axially along the hood from the nut portion close to the shoulder U at the point W.

At the back head of the cylinder in Fig. 3 I show a hood, the body portion of which is much shorter than that of the hood shown in Fig. 1. This hood is adapted to a cylinder-head without a water-jacket. Otherwise the construction is the same.

In Fig. 4 I illustrate a hood adapted to be used between the initial and compound cylinders of a compound air-compressor. In this hood the air-passages V are formed in the body portion of the hood, and the air that flows into the hood would be air that had been compressed in the initial cylinder and was being conducted by the passage X to the valve to be drawn through the valve by the piston of the compound cylinder.

The operation of my valve is as follows: As the piston Z of Fig. 3 moves in the direction of the arrow 1 it creates a vacuum and suction and the atmospheric air rushes and is drawn into the hood and forces the seat of the valve from its seat against the end of the hood and rushes into the cylinder. This movement of the valve causes it to slide on the body of the valve-stem and its head and compress the spring M on the stem A between the shoulder of the valve and the head of the stem, and the instant the strength of the spring is greater than the force of the inflowing air the valve is automatically and quickly returned to its seat against the end of the hood by it.

My improved valve is very simple, strong, reliable, and durable, and is practically dust-proof and will not bind or stick, and it allows a large volume of air to pass quickly into the cylinder.

Having described my invention, what I claim as new, and desire to secure by Letters Patent, is—

1. In an air-inlet valve the combination of a stationary stem having an enlarged head portion at one end, a valve having a hollow shank mounted to slide reciprocatively on the head and body portion of said stem and having an enlarged chamber portion in its hollow body portion and a coiled spring in said chamber around said stem arranged to bear at one end against one end of said chamber and at its opposite end against said head portion of said stem and to hold said valve in an operative position, substantially as described.

2. In an air-inlet valve the combination of the hood having the nut portion, the air-passages, the threaded open end and the valve-seat, with the stationary stem threaded axially in said hood to said nut portion, a check-nut in the end of said stem bearing against the end of said nut portion of said hood, a screw-slot in the threaded end of said stem, and with a valve slidably mounted on said stem, the washer in the open end of said valve and a retracting spring operatively mounted between said stem and valve to resiliently hold said valve in operative engagement with the valve-seat of said hood, substantially as described.

In testimony whereof I affix my signature in presence of two witnesses.

JOHN GEORGE LEYNER.

Witnesses:
SAMUEL ELISHA FOWLER,
CLARENCE A. LAWSON.